(12) United States Patent
Vera et al.

(10) Patent No.: US 8,402,310 B2
(45) Date of Patent: *Mar. 19, 2013

(54) DETECTING SOFT ERRORS VIA SELECTIVE RE-EXECUTION

(75) Inventors: Xavier Vera, Barcelona (ES); Oguz Ergin, Ankara (TR); Osman Unsal, Barcelona (ES); Jaume Abella, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/284,086

(22) Filed: Oct. 28, 2011

(65) Prior Publication Data

US 2012/0047398 A1 Feb. 23, 2012

Related U.S. Application Data

(63) Continuation of application No. 12/224,762, filed as application No. PCT/ES2006/070041 on Mar. 31, 2006.

(51) Int. Cl.
*G06F 11/00* (2006.01)
*G06F 11/14* (2006.01)
(52) U.S. Cl. ............... 714/17; 714/15; 714/16
(58) Field of Classification Search ............ 714/16, 714/17, 47.1, 47.2, 15
See application file for complete search history.

(56) References Cited

U.S. PATENT DOCUMENTS

| | | | |
|---|---|---|---|
| 4,852,092 A | 7/1989 | Makita | |
| 5,572,662 A | 11/1996 | Ohta et al. | |
| 6,202,174 B1 | 3/2001 | Lee et al. | |
| 6,247,118 B1 | 6/2001 | Zumkehr et al. | |
| 6,519,730 B1 * | 2/2003 | Ando et al. | 714/746 |
| 6,625,749 B1 | 9/2003 | Quach | |
| 6,772,368 B2 * | 8/2004 | Dhong et al. | 714/11 |
| 6,785,842 B2 * | 8/2004 | Zumkehr et al. | 714/17 |
| 6,877,086 B1 * | 4/2005 | Boggs et al. | 712/218 |
| 7,146,530 B2 * | 12/2006 | Pomaranski et al. | 714/11 |
| 7,206,971 B2 | 4/2007 | Zeller et al. | |
| 7,617,360 B2 | 11/2009 | Arai et al. | |
| 7,849,369 B2 | 12/2010 | Holt | |
| 2002/0144176 A1 | 10/2002 | Smith | |
| 2002/0199175 A1 | 12/2002 | Saulsbury | |
| 2004/0064756 A1 * | 4/2004 | Kadambi | 714/17 |
| 2004/0205385 A1 | 10/2004 | Smith | |
| 2007/0113055 A1 * | 5/2007 | Dale et al. | 712/228 |

OTHER PUBLICATIONS

Korean Patent Office, Notice of Preliminary Rejection mailed on May 26, 2010 in Korean patent application No. 10-2008-7023877.
State Intellectual Property Office, P.R. China, First Office Action issued Jun. 10, 2010 in Chinese application No. 200680054141.5.

* cited by examiner

*Primary Examiner* — Joseph Schell
(74) *Attorney, Agent, or Firm* — Trop, Pruner & Hu, P.C.

(57) ABSTRACT

In one embodiment, the present invention includes a method for determining a vulnerability level for an instruction executed in a processor, and re-executing the instruction if the vulnerability level is above a threshold. The vulnerability level may correspond to a soft error likelihood for the instruction while the instruction is in the processor. Other embodiments are described and claimed.

20 Claims, 5 Drawing Sheets

DETECTING SOFT ERRORS VIA SELECTIVE RE-EXECUTION

This application is a continuation of U.S. patent application Ser. No. 12/224,762, filed Sep. 5, 2008, the content of which is hereby incorporated by reference, which, pursuant to 35 U.S.C. §119, claims priority to International Patent Application Serial No. PCT/ES2006/070041, filed Mar. 31, 2006, the subject matter of which is incorporated herein by reference.

BACKGROUND

Embodiments of the present invention relate to error detection in semiconductor devices, and more particularly to error detection in processors.

Transient errors, often referred to as soft errors, are an increasing source of errors in processors. Because of the decreased size of devices and reduced voltages at which they operate, these devices are more vulnerable to cosmic particle strikes and parameter variations. Such events can lead to transient errors that occur randomly and can affect proper execution of a processor. With each generation of semiconductor manufacturing technology, susceptibility to soft errors is expected to increase.

Certain mechanisms have been used to attempt to correct soft errors. Typically, these measures include providing redundant paths for redundant operations on data. However, such redundant paths can significantly increase the size and power consumption of a processor, leading to performance degradation. Furthermore, some approaches use simultaneous multithreading (SMT) to detect errors. In such approaches, a process is scheduled on two separate execution paths (e.g., two threads in a SMT core). The resulting data are then compared for identity. If the results differ, this is an indication of a soft error, and the error is detected. However, performance degradation is significant, since some hardware is devoted to error detection instead of running other processes and complexities exist in supporting result comparison and thread coordination.

DETAILED DESCRIPTION

In various embodiments, soft errors in a processor may be detected and appropriate measures may be taken to correct such errors. Such soft error detection can be performed with minimal complexity or added power consumption. Furthermore, embodiments may use existing processor structures to perform the error detection. Alternately, a minimal amount of additional hardware may be implemented to perform the soft error detection.

To perform soft error detection, instructions in a processor pipeline may be selectively replicated or re-executed based on different parameters. For example, only those instructions that are particularly likely to be subjected to soft errors (e.g., based on size and/or length of time in a processor) can be selectively replicated. In this way, a significant amount of soft errors may be detected with minimal performance impact.

Soft error detection in accordance with an embodiment of the present invention may be implemented in different ways. In some embodiments, existing processor structures may be used to perform the soft error detection via one or more algorithms for the error detection. In other embodiments, additional controllers, logic and/or functional units may be present in a processor to handle the soft error detection. At a high level, soft error detection may be implemented by identifying instructions in a processor pipeline that are particularly vulnerable to soft errors and re-executing such instructions. If the results of the original instruction and the replicated instruction match, no soft error is indicated. If instead the results differ, a soft error is indicated and a recovery mechanism may be applied to resolve the error.

Instruction vulnerability depends, in large part, on the area an instruction utilizes in the processor and the time the instruction spends inside the processor. For example, many instructions spend a high number of cycles in a processor before commitment, while other instructions traverse the pipeline without stalling for a single cycle. Moreover, not all instructions utilize the same hardware resources. For soft error detection coverage, the most vulnerable instructions may be replicated to provide the largest possible error coverage possible with minimum performance impact.

In one embodiment, vulnerable instructions may be replicated at the time of instruction commitment (i.e., at instruction retirement) before the instruction leaves the pipeline. In this embodiment, a set of arithmetic logic units (ALUs) can be included within a processor to validate outputs of the vulnerable instructions when they arrive at the top of a reorder buffer (ROB), for example, by re-execution of the instructions.

Because different instructions occupy different amounts of storage and spend different amounts of time in a processor during their lifetime, the vulnerability of each instruction to soft errors is different. By identifying such more vulnerable instructions, high coverage of soft error detection can be achieved with a minimal level of instruction replication. In this way, minimal hardware resources and power dissipation can be used to achieve a maximum amount of error detection coverage with a minimum performance impact. In various embodiments, the soft error vulnerability of an instruction can depend on instruction type (e.g., load, store, branch, arithmetic), time spent by the instruction inside the processor (or a specific processor component), and other characteristics of the instruction (e.g., source data being ready, immediate field is narrow, and thus having a reduced number of bits).

Not all instructions occupy the same space inside the processor components. For example, load and store instructions may store a memory order buffer index inside their entries while other instructions do not use this field. Likewise, store and branch instructions do not generate any result and thus do not have any destination register assigned to them, so they do not use an issue queue field that stores a destination register index. These bits that are not used are not vulnerable to particle attacks and thus reduce instruction vulnerability. Vulnerability status of some bits inside an issue queue entry may also be dependent on input variations or dynamics of a superscalar pipeline. If the sources of an instruction are ready when the instruction is dispatched into the issue queue, source tag fields inside the issue queue are vulnerable. Similarly, using a narrow operand identification technique on the immediate field can render a significant portion of the immediate field of an instruction invulnerable, reducing the overall vulnerability of the instruction.

Figure 1:
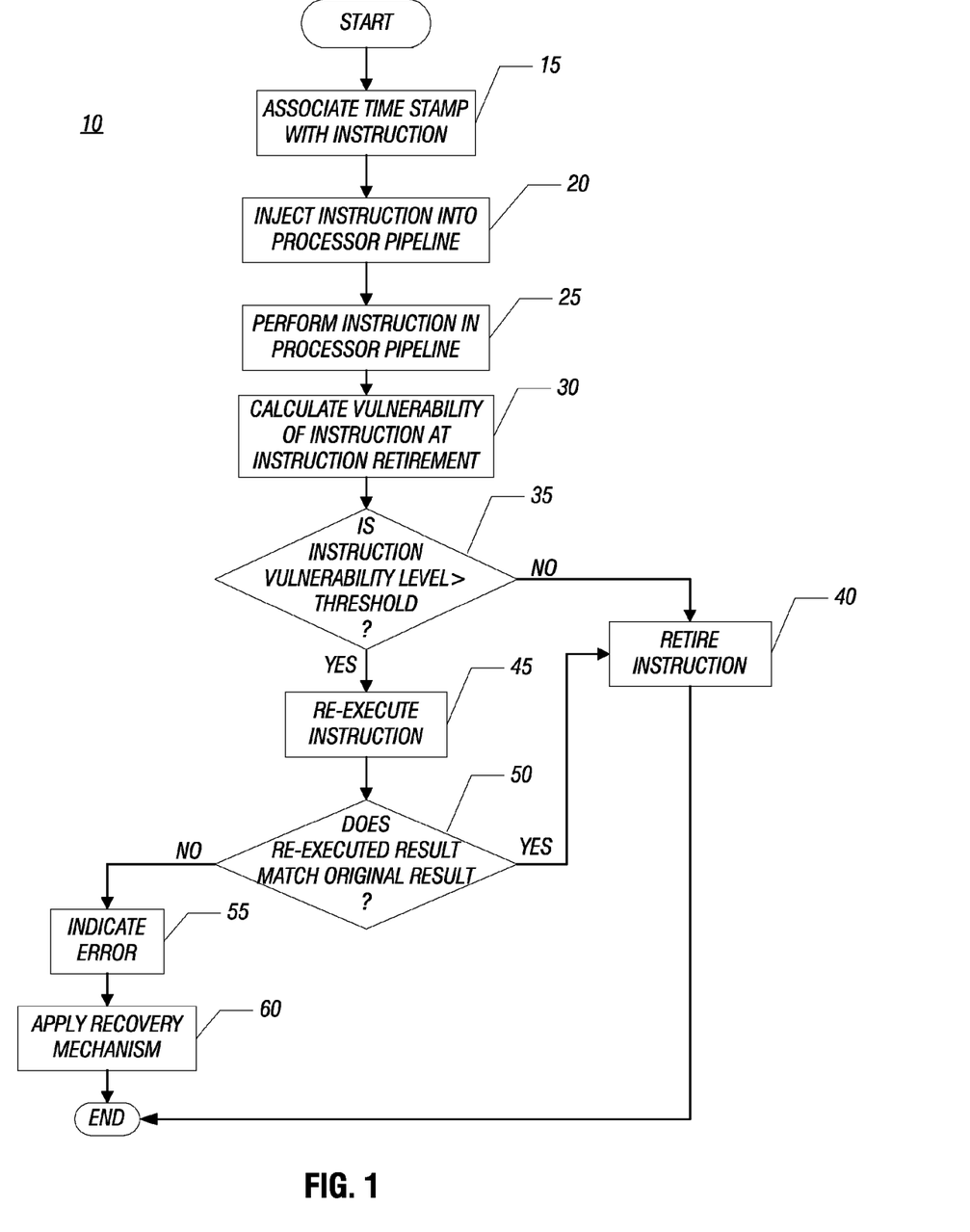
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may begin by associating a time stamp with an instruction (block 15). For example, a front end of a processor may associate a time stamp with an incoming instruction as it is placed into a buffer such as a reorder buffer (ROB). In various embodiments, instructions may correspond to microoperations (µops), although error detection may be implemented at different instruction granularity levels in other embodiments. While described herein with respect to particular processor structures, it is to be understood that the scope of the present invention is not so limited and soft error detection may be implemented in other locations. Further, while described as associating a time stamp with an instruction as it enters a front end of a processor, the time stamp may be associated with the instruction at other points in a processor pipeline instead.

Still referring to FIG. 1, next the instruction may be injected into the processor pipeline (block 20). Accordingly, when the instruction is scheduled for execution, the instruction may be performed in the processor pipeline (block 25). After execution, a vulnerability of the instruction may be calculated at the time of instruction retirement (block 30). For example, the status of an instruction in the ROB is set as ready to commit when it finishes its execution, and waits until it reaches the top of the ROB to be retired (i.e., is the oldest in time instruction). At that time, the vulnerability of the instruction to a soft error may be calculated. Such calculation may take many different forms in different embodiments. The calculation may take into account both an area of the processor consumed by the instruction, as well as a length of time that the instruction is present in the processor. Accordingly information based on the time stamp as well as instruction width (including various fields of the instruction, source information and the like) may be considered.

Next, it may be determined whether the instruction vulnerability level determined is greater than a threshold (diamond 35). This threshold may be user set and in some embodiments may be an adaptive threshold based on a desired level of performance for the processor. If the instruction vulnerability level is lower than the threshold, control passes to block 40, where the instruction may be retired. Thus method 10 concludes.

If instead at diamond 35 it is determined that the instruction vulnerability level is greater than the threshold, control passes to block 45. There, the instruction may be re-executed (block 45). In some embodiments the instruction may be replicated and re-executed in the same processor pipeline, however, in various implementations one or more additional functional units may be provided to perform the re-execution.

After re-execution, the original result may be compared to the re-executed result to determine whether the results match (diamond 50). If so, this is an indication that no soft error exists and accordingly, control passes to block 40 (discussed above), where the instruction retires. If instead, it is determined at diamond 50 that the results differ, control passes to block 55. At block 55, a soft error is thus indicated. The indication may take many different forms, including a signal to certain control logic of the processor or another such location. Based on the indicated error, an appropriate recovery mechanism may be applied (block 60). The recovery mechanism may vary in different embodiments and may include re-execution of the instruction, a flushing of some or all of various processor resources, or other such recovery mechanisms. While described with this particular implementation in the embodiment of FIG. 1, it is to be understood that the scope of the present invention is not so limited.

Figure 2:
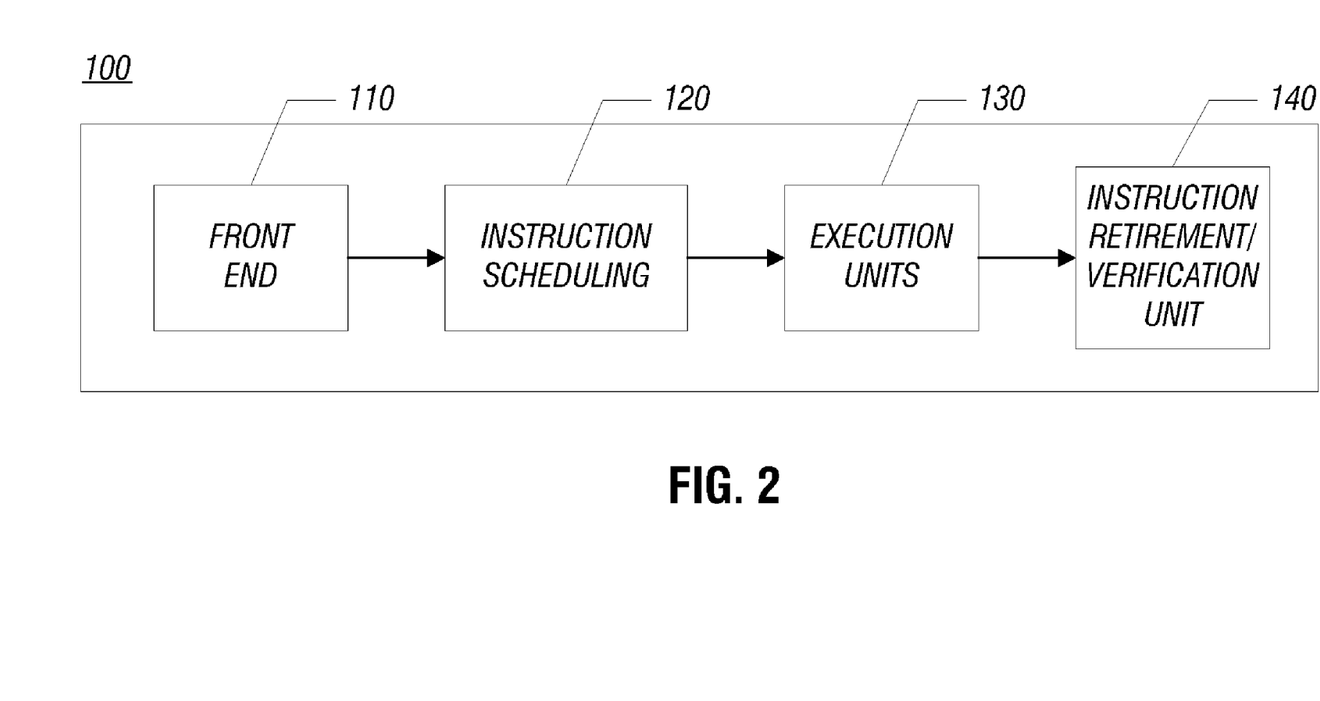
FIG. 2 is a block diagram of a generic processor architecture in accordance with one embodiment of the present invention.

As discussed above, embodiments may be implemented in many different processor architectures. For purposes of illustration, FIG. 2 shows a block diagram of a generic processor architecture in accordance with one embodiment of the present invention. As shown in FIG. 2, processor 100 may be an out-of-order processor. However, the scope of the present invention is not so limited and other embodiments may be implemented in an in-order machine. Processor 100 includes a front end 110, which may receive instruction information and decode the information into one or more microoperations for execution. Front end 110 is coupled to an instruction scheduling unit 120, which may schedule the instructions for execution on a selected one of a number of execution units 130. While such units may vary, integer, floating-point, single instruction multiple data (SIMD), address generation units and other such execution units may be present, in certain embodiments. Furthermore, in some embodiments one or more additional, redundant execution units may be present to perform soft error detection in accordance with an embodiment of the present invention.

Still referring to FIG. 2, when instructions have been executed in a selected execution unit, the instructions may be provided to an instruction retirement/verification unit 140. Unit 140 may be used to retire instructions, performed in different orders within the processor pipeline, back into an in-order retirement according to program order. Unit 140 may further be adapted to perform soft error detection in accordance with an embodiment of the present invention. Specifically, at retirement time, each instruction that is deemed to be vulnerable to a soft error at a level greater than a given threshold may be re-executed, e.g., in an additional execution unit within execution units 130. Based on the result of such re-execution, the original instruction's result is either confirmed and the instruction retires or a soft error is indicated and an appropriate recovery mechanism is implemented. While described with this high-level architecture in FIG. 2, it is to be understood that the scope of the present invention is not so limited and specific variations are contemplated.

Figure 3:
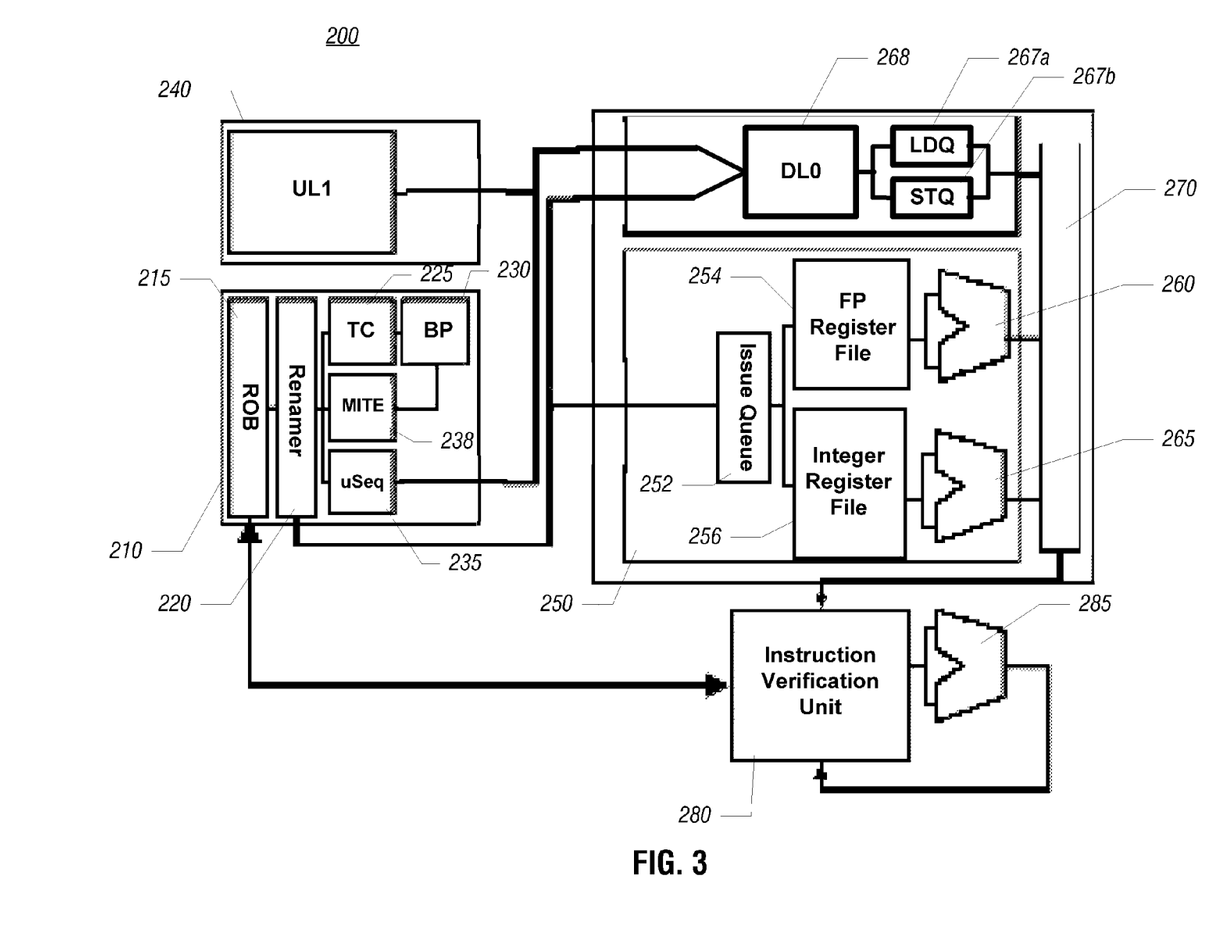
FIG. 3 is a block diagram of a processor in accordance with one embodiment of the present invention.

Referring now to FIG. 3, shown is a more detailed block diagram of a processor in accordance with one embodiment of the present invention. As shown in FIG. 3, processor 200 may include various resources to perform instructions. Processor 200 shown in FIG. 3 may correspond to a single core processor or alternately may be one core of a multicore or many-core processor, in other embodiments.

As shown in FIG. 3, processor 200 may include a front end 210 that includes various resources. In the embodiment of FIG. 3, a ROB 215 may be present which is coupled to a renamer unit 220 which takes instructions and renames logical registers within the instructions onto the greater number of physical registers within register files of the processor. From renamer 220, instructions may be coupled to a trace cache 225 which is coupled to a branch predictor 230 to aid in predicting branches of execution. A microinstruction translation engine (MITE) 238 is coupled to provide translated instructions to a micro sequencer 235, which in turn is coupled to a unified cache memory 240 (e.g., a level 1 or level 2 cache). A data cache 268 may also be coupled to unified cache memory 240, and to a load queue 267a and a store queue 267b.

Still referring to FIG. 3, renamed instructions may be provided to an execution unit 250 that includes an issue queue 252 that receives incoming instructions and places them in a queue for storage and scheduling onto one of a number of functional units. Issue queue 252 is further coupled to a pair of register files, namely a floating-point (FP) register file 254 and an integer register file 256. When needed source data for an instruction are present in a selected register file, the instruction may be executed as scheduled on one of a number of functional units, two of which are shown for ease of illustration in FIG. 3. Specifically, a first execution unit 260 and a second execution unit 265, which may correspond to a floating-point logic unit and an integer logic unit, respectively, may be present. Results from execution of instructions may be transmitted through an interconnection network 270 to various locations. For example, in given architectures, the result data may be provided back to register files 254 and 256, load queue 267a, store queue 267b, and/or may be provided back to ROB 215.

Furthermore, result data may be provided to an instruction verification unit 280. Unit 280 may perform soft error detection in accordance with an embodiment of the present invention. As shown, instruction verification unit 280 may be coupled to interconnection network 270 and further may be coupled to ROB 215. In various embodiments, instruction verification unit 280 may include various resources, including a buffer arranged similarly to that of ROB 215. In one embodiment, instruction verification unit 280 may include a recheck source buffer (RSB) which may be an extension of ROB 215. That is, the RSB may be a first-in-first-out (FIFO) buffer including the same number of entries as ROB 215. In other embodiments, a buffer for instruction verification purposes may simply use ROB 215. In one embodiment, each entry of ROB 215 (and a buffer in instruction verification unit 280, if present) may take the form of that shown in Table 1 below:

TABLE 1

| Instruction | Source Tags | Time Stamp | Result |
| --- | --- | --- | --- |

As shown in Table 1, each entry of ROB 215 may include various fields. Specifically, as shown in Table 1, each entry may include an instruction field, which may correspond to a microoperation. Furthermore, each entry may include source tags to identify the location of needed data. Still further, each entry may include a time stamp, indicating the time at which the entry was created in ROB 215. Finally, as shown in Table 1 each entry may include a result field in which to store a result of the instruction. While described with this particular implementation in the embodiment of Table 1, it is understood that the scope of the present invention is not so limited and entries in a ROB or RSB may include additional or different fields.

Instruction verification unit 280 may further include its own dedicated functional units 285 to re-execute the selected instruction (or alternatively it can use the already available functional units). The RSB may hold the result value produced by all of the instructions, instruction opcodes and source tags to verify the result (or address if it is a memory or branch operation) of the instruction at commit time if the instruction is identified as vulnerable.

Instruction verification unit 280 may further include a microcontroller, logic or other resources for performing soft error detection. Specifically, the resource may receive an instruction, e.g., at commit time and determine a vulnerability measure for the instruction. While this vulnerability measure may take many different forms, in one embodiment instruction verification unit 280 may perform a calculation to determine an instruction vulnerability level in accordance with the following equation:

$$\text{Instruction Vulnerability Level} = \text{Occupied Bit Area} \times \text{Time Spent} \quad [\text{Eq. 1}]$$

The instruction vulnerability level may be based on the Occupied Bit Area of the instruction, including its various fields of source identifiers, destination identifiers and the like, multiplied by the Time Spent in the processor, which may correspond to the time the instruction has spent in the processor, e.g., as measured by a time stamp from initial instruction insertion into ROB 215 to the time of instruction commitment. In other embodiments, a vulnerability measure may be based on only one of the Occupied Bit Area and Time Spent, or different combinations of these values.

This instruction vulnerability level may be compared to a threshold. As an example of operation, assume a threshold of 1000. If on average, an instruction covers 50 bits of vulnerable bit space, any instruction that spends more than 20 cycles in the issue queue is re-executed via selective replication. Such delays can be because of a long dependency chain or a long latency operation such as floating-point division. In various embodiments, the threshold may vary widely. For example, a threshold of zero would cause re-execution of every instruction, while a large threshold (e.g., 5000) may cause the re-entry of only a small percentage (e.g., less than 10%) of instructions. In one embodiment, a threshold of 1000 may represent a good tradeoff.

If the vulnerability level is below the threshold, the instruction commits normally and instruction verification unit 280 takes no further action. If instead it is determined that the instruction vulnerability level is greater than the selected threshold, the instruction may be more vulnerable to a soft error. If the instruction vulnerability value is high, this means that the instruction occupies a high number of bits and/or it spent a long time in the processor components, which makes it more vulnerable. In various embodiments, just those instructions that are above the selected vulnerability threshold are replicated. In this way, a maximum amount of error coverage is affected by replicating a minimum number of instructions. By performing the instruction vulnerability analysis at instruction commitment, instructions that are not architecturally correct execution (ACE) that have been removed from the pipeline before reaching the commit stage are filtered out. Also the instruction vulnerability information can be gathered more accurately at commit time, since the amount of time the instruction spent inside the processor is known exactly along with the amount of space it occupied.

In various embodiments, instruction verification unit 280 may re-execute the instruction by taking the instruction's information, obtaining the source data of the instruction and providing it to one or more additional functional units 285 associated with instruction verification unit 280. In various embodiments, a vulnerable instruction is re-executed by using information stored inside the RSB. In one implementation, source register tags are stored in the RSB and used to access register files 254 and 256 to gather source data for verification. These register files may include two additional read ports (one port for each source operand) for verification purposes. Accessing register files 254 and 256 for selective re-execution may thus cover errors that occur while the instruction is inside issue queue 252 and the source tags are vulnerable to particle strikes. Alternately, source values can be stored inside the RSB when they are first read to avoid having additional ports on the register files.

The result of a re-executed instruction is passed back to instruction verification unit 280, where the re-executed result is compared to the original result. If the two results match, no further action is taken by instruction verification unit 280 and the instruction retires. If however the results do not match, a soft error is indicated and instruction verification unit 280 may signal the soft error to one or more locations within processor 200. At this time, processor 200 may perform an error recovery mechanism. For example, if the two results mismatch, instruction verification unit 280 may initiate a flush of the processor, which resumes execution starting from the faulting instruction. While described with this particular implementation in the embodiment of FIG. 3, it is to be understood that the scope of the present invention is not so limited.

Some optimizations are possible in certain embodiments. Instead of verifying only the instruction at the head of a ROB or other retirement location, verifying more than one instruction each cycle can be effected. Furthermore, multiple thresholds and a performance metric to identify the time intervals when the processor loses performance because of verification can be implemented. During such intervals, only the very vulnerable instructions may be replicated. As an example, during times of low performance, the threshold may be set higher to reduce the number of instructions subject to re-execution. Still further, adaptive threshold levels can be used, which are changed according to processor state (e.g., error rate, performance, power, and the like). Accordingly, depending on a given processor state, one of a number of different vulnerability thresholds may be selected for comparison to computed instruction vulnerability values.

In some embodiments, error detection in accordance with an embodiment of the present invention may be used in conjunction with vulnerability reduction techniques, such as flush and restart or narrow value identification. Flushing and restarting a pipeline, e.g., pursuant to an off-chip cache miss, will reduce the soft error vulnerability of many instructions by reducing the time they spent inside the issue queue and can thus reduce the number of instructions re-executed via soft error detection. Further, lower threshold levels can be set to increase error coverage when a flush and restart mechanism or other vulnerability reduction technique is in place.

Figure 4:
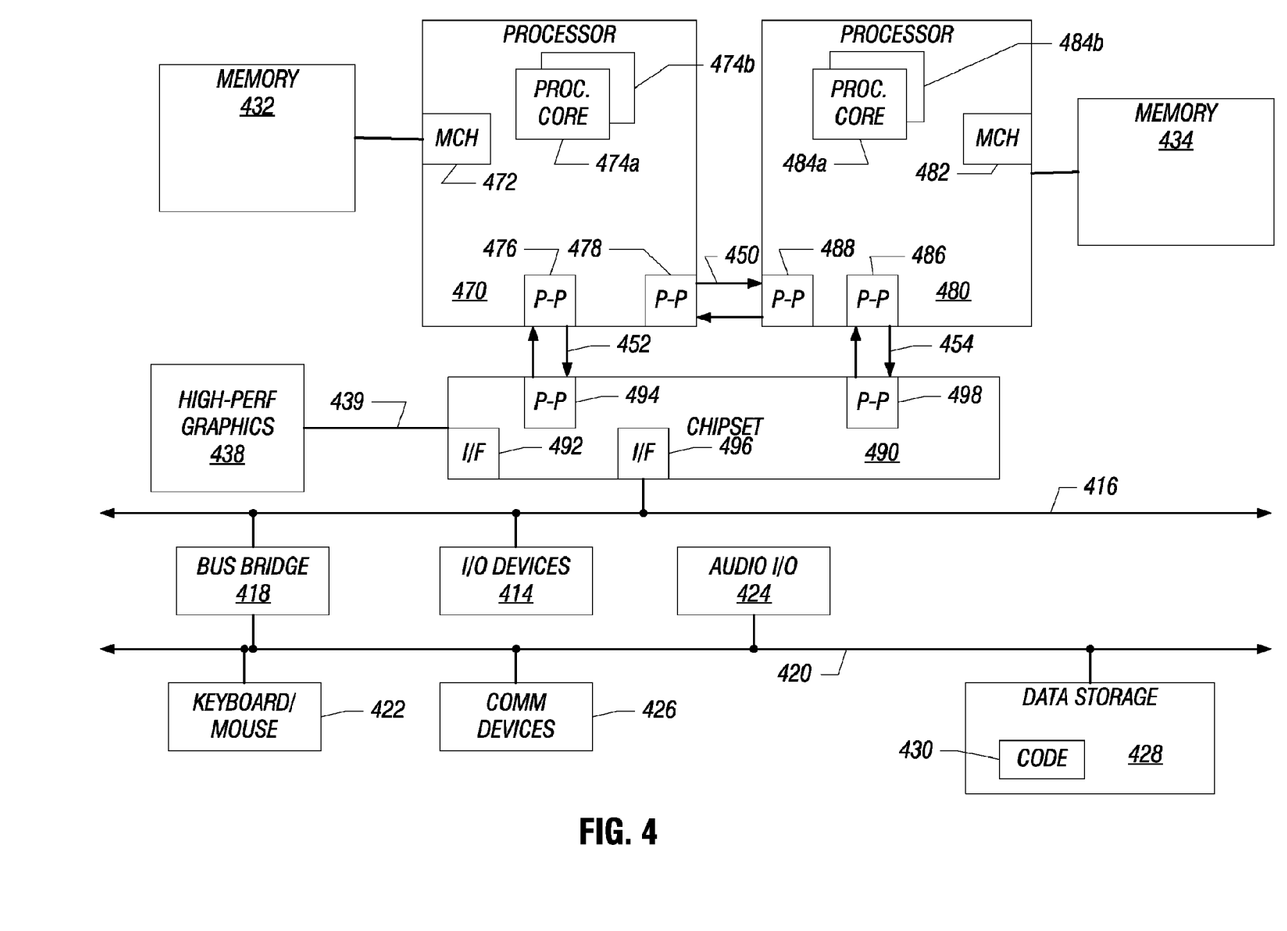
FIG. 4 is a block diagram of a multiprocessor system in accordance with an embodiment of the present invention.

Embodiments may be implemented in many different system types. Referring now to FIG. 4, shown is a block diagram of a multiprocessor system in accordance with an embodiment of the present invention. As shown in FIG. 4, the multiprocessor system is a point-to-point interconnect system, and includes a first processor 470 and a second processor 480 coupled via a point-to-point interconnect 450, although other kinds of interconnects can be used in other embodiments. As shown in FIG. 4, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may include vulnerable instruction identification and verification logic to detect soft errors in accordance with an embodiment of the present invention. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 4, MCH's 472 and 482 couple the processors to respective memories, namely a memory 432 and a memory 434, which may be portions of main memory locally attached to the respective processors.

First processor 470 and second processor 480 may be coupled to a chipset 490 via P-P interconnects 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 4, a system may implement a multi-drop bus or another such architecture.

Figure 5:
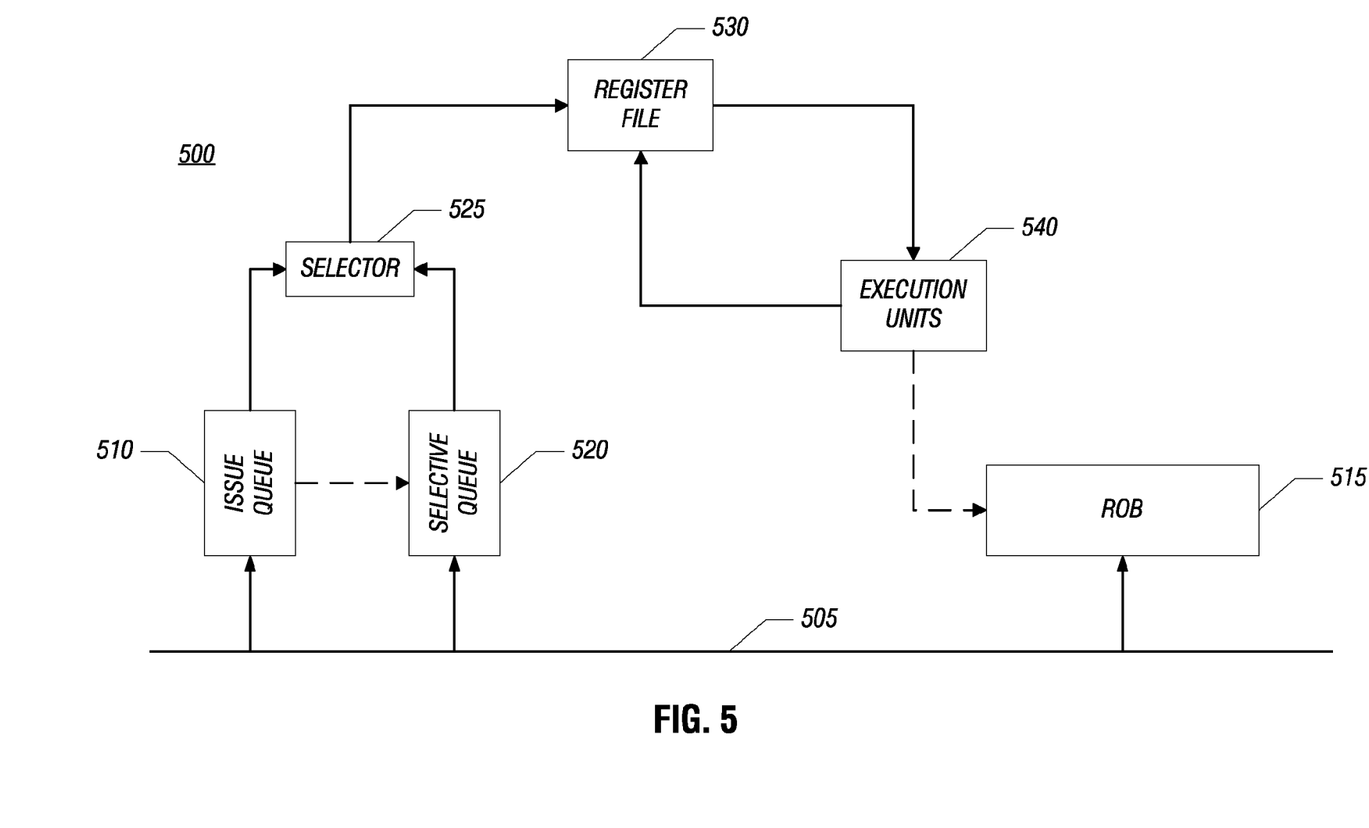
FIG. 5 is a block diagram of a portion of a processor in accordance with an embodiment of the present invention for selective instruction re-execution.

Furthermore, it is to be understood that in various embodiments, different processor structures and different manners of performing selective instruction replication may be realized. For example, in some embodiments instructions may be selectively re-executed during a time window between when instructions are retireable and when they actually retire. Different manners of performing such selective re-issuance of instructions may be realized. Referring now to FIG. 5, shown is a block diagram of a portion of a processor in accordance with an embodiment of the present invention for selective instruction re-execution.

As shown in FIG. 5, processor 500 includes an issue queue 510 that is coupled to receive incoming instructions via an internal bus 505. As further shown in FIG. 5, a selective queue 520 may further be coupled to receive the incoming instructions. Still further, the instructions may also be provided to a ROB 515.

As further shown in FIG. 5, issue queue 510 and selective queue 520 are coupled to a selector 525, which may select an instruction from one of these queues for passing to a register file 530, which in turn may be coupled to one or more execution units 540. As shown in FIG. 5, execution unit(s) 540 is further coupled to ROB 515. Whenever a port is available for execution, an instruction in selective queue 520 (whose counterpart in issue queue 510 has already been issued) is issued and executed. When an instruction finishes its execution, results are stored in ROB 515. When the replica instruction execution finishes, its result is compared against the stored original result for validation purposes. If the head of ROB 515 is ready to commit but has not been validated, the commit may stall.

In some embodiments, ROB 515 may add certain fields (e.g., a compare bit, a validated bit, an error detected bit, and bits for storing the result) to each entry. However, in other embodiments a different array may be used for such storage. When a ROB entry is allocated to a new instruction, these extra fields in the entry are reset. When instructions finish their execution, their results are written to ROB 515. When the original instruction finishes, the result may be written and the compare bit set. Then the second instruction (i.e., the replica) when executed finds the compare bit set, and causes the stored value to be compared with the re-executed result and sets a validated bit in the ROB entry. The result of comparison is stored in the error detected bit to indicate whether the results match. One alternative to the compare bit may be a bit associated with the instruction to identify whether it is the original or replica instruction.

As discussed above, when an instruction is placed into issue queue 510, it is also stored into selective queue 520. Each entry within selective queue 520 may include the opcode, source tags (to read sources from register file 530), a ROB entry identifier, and a ready bit indicating whether it is ready for re-issuance. Note that the entry in issue queue 510 may also store its corresponding entry in selective queue 520, as well as storing its corresponding entry in ROB 515. Once the original instruction issues from issue queue 510, it sends a signal to its corresponding entry in selective queue 520 to set the ready bit. The total number of entries in selective queue 520 may be the same as the number of entries in ROB 515. Note that the latency of selective queue 520 is not critical for performance; thus, it may be implemented with slower and power-efficient designs and even low-power transistors.

Selector 525 may be a multiplexer that chooses between instructions from issue queue 510 and selective queue 520. In various embodiments, selector 525 may prioritize instructions from issue queue 510. Selective queue 520 may select an instruction for passing to selector 525 from among those that have the ready bit set. This can be done with a chain of gates (since it is not in the critical path, it does not affect cycle time), or by means of multibanking, i.e., forming selective queue 520 with as many banks as issue ports, so that only the oldest instruction in a bank can compete for a port. If there is a free port, the instruction from selective queue 520 issues, otherwise it waits.

As discussed above, soft error vulnerability of an instruction may depend on the area that it occupies and the time spent in the processor. When an entry in selective queue 520 has a set ready bit, its vulnerability value may be compared to a threshold. Note that it is known how many cycles an instruction spends in issue queue 510 because the instruction is allocated in issue queue 510 and selective queue 520 simultaneously. Thus the time elapsed between the placement in selective queue 520 and reception of the signal to set the ready bit may be used as a measure of time spent. If the vulnerability value is below the threshold, the entry in selective queue 520 may be freed, the validated bit in the corresponding ROB entry is set and the error detected bit in the ROB entry is reset. In some embodiments, time (e.g., via time stamps) may be used as the vulnerability value instead of the product of area and time.

For validation purposes, each entry in ROB 515 may include a validated bit, explained above. If the validated bit is not set, commit may stall waiting for validation. When the validated bit is set, the instruction is ready to commit only if its error detected bit is reset. If the error detected bit is set, different actions can be taken. For instance, the pipeline may be flushed to re-execute the faulty instruction or an exception may be raised. Upon a branch misprediction, entries no longer valid in issue queue 510 and selective queue 520 can be eliminated. The same mechanism used in issue queue 510 may be used to remove entries in selective queue 520.

Note that the redundant hardware itself may be vulnerable to particle strikes. However, its vulnerability is zero. That is, if there is a strike to selective queue 520, a wrong instruction will execute which will likely raise a false positive. It may happen that the strike hits the ROB entry identifier or the validated bit in ROB 515, which may cause a deadlock, since the head of ROB 515 would wait to be validated. This can be solved by either parity protecting the ROB entry identifier in selective queue 520, or adding a watchdog timer, and if the commit stalls for more than a given number of cycles, the instruction may be squashed and restarted.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   executing an instruction in a processor;
   determining, at retirement of the instruction, a vulnerability level for the instruction corresponding to a soft error likelihood for the instruction based at least on an area of the processor occupied by the instruction; and
   re-executing the instruction if the vulnerability level is above a threshold.

2. The method of claim 1, further comprising re-executing the instruction in a different execution unit of the processor than a first execution unit of the processor in which the instruction was executed.

3. The method of claim 1, further comprising determining the vulnerability level further based on a time period associated with a lifetime of the instruction.

4. The method of claim 3, further comprising using a time stamp associated with the instruction to determine the time period.

5. The method of claim 1, wherein the area occupied by the instruction includes a width of the instruction.

6. The method of claim 1, further comprising:
   determining if a result of the re-executed instruction matches a result of the instruction; and
   flushing the processor if there is no match.

7. The method of claim 1, further comprising adaptively changing the threshold based on a state of the processor.

8. The method of claim 1, further comprising flushing a pipeline of the processor and restarting the pipeline pursuant to an off-chip cache miss.

9. An apparatus comprising:
   a processor core including:
   a front end unit to receive instructions and decode the instructions into microoperations for execution;
   at least one execution unit coupled to the front end unit to receive and execute the micro operations; and
   a retirement unit to receive the instructions, the retirement unit including an instruction verification unit to determine a vulnerability of the instructions to a soft error, the instruction verification unit comprising at least one execution unit to re-execute vulnerable instructions, the vulnerable instructions having a vulnerability level greater than a threshold.

10. The apparatus of claim 9, wherein the instruction verification unit includes a logic to determine the vulnerability level based on an area value for an instruction.

11. The apparatus of claim 10, wherein the logic is to determine the vulnerability level further based on a time value for the instruction.

12. The apparatus of claim 11, wherein the logic is to determine the time value based on time stamp information associated with the instruction.

13. The apparatus of claim 9, wherein the threshold is adjustable based on a selected performance metric, wherein the threshold is to be set higher for a higher level of performance.

14. The apparatus of claim 9, wherein the front end unit includes a reorder buffer including a plurality of entries each corresponding to an instruction and having an instruction field, a source tag field, a time stamp field to indicate a time at which the entry was created, and a result field.

15. A system comprising:
a processor including at least one execution unit to execute an instruction to obtain an original result, the processor further including an instruction verifier to compare a vulnerability value of the instruction to a threshold, trigger re-execution of the instruction to obtain a re-executed result if the vulnerability value is greater than the threshold, and compare the original result to the re-executed result; and
a dynamic random access memory (DRAM) coupled to the processor.

16. The system of claim 15, wherein the instruction verifier is to flush the processor if the comparison of the original result to the re-executed result indicates a mismatch.

17. The system of claim 15, wherein the processor includes an issue queue to store incoming instructions and a selective queue to store the incoming instructions, and a selector to select an instruction from one of the issue queue and the selective queue for execution.

18. The system of claim 17, wherein the re-execution of the instruction is to occur from the instruction stored in the selective queue.

19. The system of claim 15, wherein the threshold is an adaptive threshold and the processor is to adjust the threshold based on a selected performance level.

20. The system of claim 15, wherein the instruction verifier is to determine the vulnerability value based on a size and lifetime of the instruction.

* * * * *